(12) United States Patent
Kamhine

(10) Patent No.: US 7,158,512 B1
(45) Date of Patent: Jan. 2, 2007

(54) SYSTEM AND METHOD FOR SCHEDULING A CROSS-BAR

(75) Inventor: Eli Kamhine, St. Givat Shmuel (IL)

(73) Assignee: P-Cube Ltd., Herzliya (IE)

( * ) Notice: Subject to any disclaimer, the term of this patent is extended or adjusted under 35 U.S.C. 154(b) by 1030 days.

(21) Appl. No.: 10/109,718

(22) Filed: Apr. 1, 2002

(51) Int. Cl.
*H04L 12/28* (2006.01)

(52) U.S. Cl. ................ 370/389; 370/398; 370/419

(58) Field of Classification Search ........ None
See application file for complete search history.

(56) References Cited

U.S. PATENT DOCUMENTS

| | | | |
|---|---|---|---|
| 4,929,940 A | 5/1990 | Franaszek et al. | |
| 4,968,977 A | 11/1990 | Chinnaswamy et al. | |
| 5,124,978 A | 6/1992 | Chao | |
| 5,179,552 A | 1/1993 | Chao | |
| 5,197,054 A | 3/1993 | Harada | |
| 5,199,028 A | 3/1993 | Arnold | |
| 5,267,235 A | 11/1993 | Thacker | |
| 5,339,396 A | 8/1994 | Muramatsu et al. | |
| 5,392,401 A | 2/1995 | Barucchi et al. | |
| 5,500,858 A | 3/1996 | McKeown | |
| 5,513,364 A | 4/1996 | Nishikawa | |
| 5,517,619 A | 5/1996 | Muramatsu et al. | |
| 5,541,914 A | 7/1996 | Krishnamoorthy et al. | |
| 5,555,543 A | 9/1996 | Grohoski et al. | |
| 6,044,061 A * | 3/2000 | Aybay et al. .......... | 370/230 |
| 6,061,345 A | 5/2000 | Hahn et al. | |
| 6,128,719 A | 10/2000 | Kim | |
| 6,195,335 B1 | 2/2001 | Calvignac et al. | |
| 6,230,229 B1 | 5/2001 | Van Krevelen et al. | |
| 6,370,148 B1 * | 4/2002 | Calvignac et al. ....... | 370/412 |
| 6,757,246 B1 * | 6/2004 | Alasti et al. .......... | 370/230 |
| 6,882,649 B1 * | 4/2005 | Gura et al. .......... | 370/395.42 |
| 6,937,133 B1 * | 8/2005 | Johnson et al. .......... | 340/2.28 |
| 6,990,072 B1 * | 1/2006 | Alasti et al. .......... | 370/230 |
| 2002/0027902 A1 * | 3/2002 | Reeve et al. .......... | 370/355 |
| 2003/0072326 A1 * | 4/2003 | Alasti et al. .......... | 370/462 |
| 2002/0001304 A1 * | 2/2006 | Johnson et al. .......... | 370/416 |

OTHER PUBLICATIONS

"The iSLIP Scheduling Algorithm for Input-Queued Switches", Nick McKeown. Stanford University, Stanford CA.

* cited by examiner

*Primary Examiner*—Bob A. Phunkulh
(74) *Attorney, Agent, or Firm*—Abelman, Frayne & Schwab

(57) ABSTRACT

The present invention is a system and a method for connection scheduling of crossbar switches having at least one ingress and at least one egress, each of the egresses is connected to at least one port, comprising at least one scheduler for scheduling matches between the ingresses and the egresses, which is in communication with the crossbar switch and at least one memory for holding data which is useful in the process of scheduling the crossbar switch. The memory is in communication with the scheduler. The scheduler schedules the matches between the ingresses and the egresses using data stored in the memory regarding the ingresses, egresses, and the ports. The scheduler operates in accordance with a selection algorithm, which is based on prioritizing of the ports. Selections are performed hierarchically as will be detailed hereinbelow. The scheduler efficiently matches between plurality of inputs and plurality of outputs, especially in crossbar systems having a large number of inputs and outputs. Matching is performed in three steps: request, grant, and accept. The data stored in the memory is stored in unique memory structures, which enable the effective processing of the stored information.

67 Claims, 11 Drawing Sheets

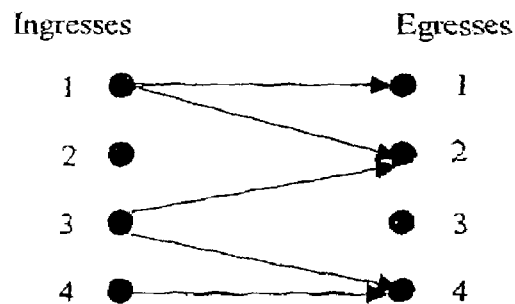
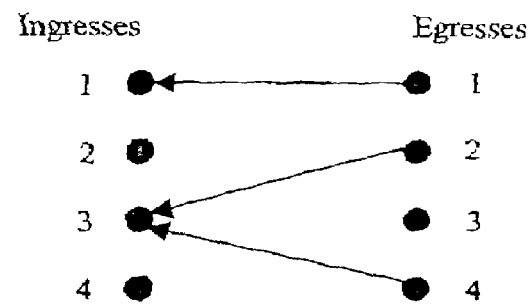
Figure 1A
Figure 1B
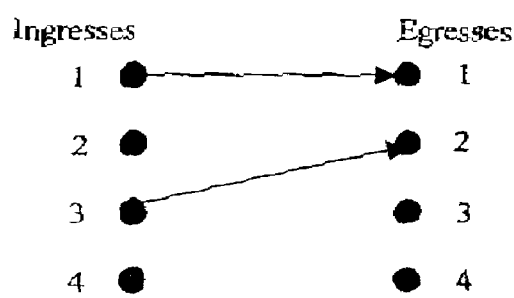
Figure 1C
Fig. 1 – Prior Art

Ingress Memory

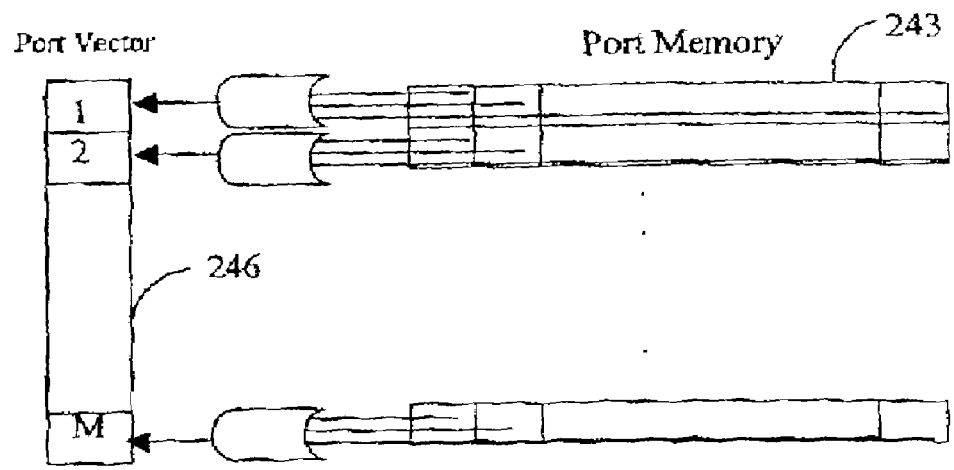
Figure 7A
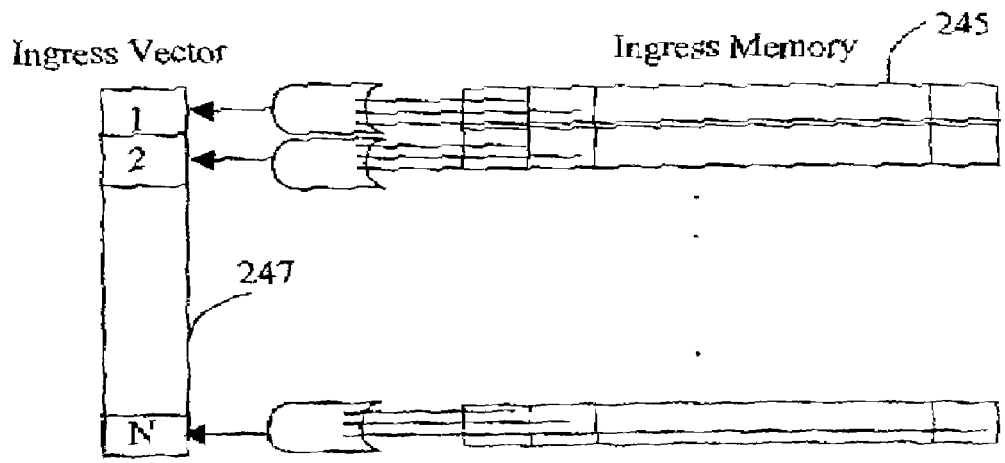
Figure 7B
Fig. 7

|  | Egress No. | Port No. |
|---|---|---|
| Ingress 1 | 1 | 1 |
| Ingress 1 | 1 | 2 |
| Ingress 1 | 3 | 2 |
| Ingress 2 | 1 | 2 |
| Ingress 2 | 1 | 6 |
| Ingress 3 | 2 | 4 |
| Ingress 4 | 4 | 7 |

Figure 9B

| Egress 914-1 | |
|---|---|
| Requested Ingress | Port |
| 1 | 1 |
| 1 | 2 |
| 2 | 2 |
| 2 | 6 |

| Egress 914-2 | |
|---|---|
| Requested Ingress | Port |
| 3 | 4 |

| Egress 914-3 | |
|---|---|
| Requested Ingress | Port |
| 1 | 2 |

| Egress 914-4 | |
|---|---|
| Requested Ingress | Port |
| 4 | 7 |

Figure 9C

Port Memory Egress handler 950-1

| Ingress \ Port | 1 | 2 | 3 | 4 |
|---|---|---|---|---|
| 1 | 1 | | | |
| 2 | 1 | 1 | | |
| 3 | | | | |
| 4 | | | | |
| 5 | | | | |
| 6 | | 1 | | |
| 7 | | | | |
| 8 | | | | |

Port Memory Egress handler 950-2

| Ingress \ Port | 1 | 2 | 3 | 4 |
|---|---|---|---|---|
| 1 | | | | |
| 2 | | | | |
| 3 | | | | |
| 4 | | | 1 | |
| 5 | | | | |
| 6 | | | | |
| 7 | | | | |
| 8 | | | | |

Port Memory Egress handler 950-3

| Ingress \ Port | 1 | 2 | 3 | 4 |
|---|---|---|---|---|
| 1 | | | | |
| 2 | 1 | | | |
| 3 | | | | |
| 4 | | | | |
| 5 | | | | |
| 6 | | | | |
| 7 | | | | |
| 8 | | | | |

Port Memory Egress handler 950-4

| Ingress \ Port | 1 | 2 | 3 | 4 |
|---|---|---|---|---|
| 1 | | | | |
| 2 | | | | |
| 3 | | | | |
| 4 | | | | |
| 5 | | | | |
| 6 | | | | |
| 7 | | | | 1 |
| 8 | | | | |

Figure 9D

Ingress memory Egress handler 950-1

| Ingress \ Port | 1 | 2 | 3 | 4 | 5 | 6 | 7 | 8 |
|---|---|---|---|---|---|---|---|---|
| 1 | 1 | 1 | | | | | | |
| 2 | | 1 | | | 1 | | | |
| 3 | | | | | | | | |
| 4 | | | | | | | | |

Ingress memory Egress handler 950-2

| Ingress \ Port | 1 | 2 | 3 | 4 | 5 | 6 | 7 | 8 |
|---|---|---|---|---|---|---|---|---|
| 1 | | | | | | | | |
| 2 | | | | | | | | |
| 3 | | | 1 | | | | | |
| 4 | | | | | | | | |

Ingress memory Egress handler 950-3

| Ingress \ Port | 1 | 2 | 3 | 4 | 5 | 6 | 7 | 8 |
|---|---|---|---|---|---|---|---|---|
| 1 | | 1 | | | | | | |
| 2 | | | | | | | | |
| 3 | | | | | | | | |
| 4 | | | | | | | | |

Ingress memory Egress handler 950-4

| Ingress \ Port | 1 | 2 | 3 | 4 | 5 | 6 | 7 | 8 |
|---|---|---|---|---|---|---|---|---|
| 1 | | | | | | | | |
| 2 | | | | | | | | |
| 3 | | | | | | | | |
| 4 | | | | | | | 1 | |

Figure 9E

Port vector Egress-1
| | |
|---|---|
| PRI-1_member-1 | 1 |
| PRI-1_member-2 | 1 |
| PRI-2_member-1 | |
| PRI-2_member-2 | |
| PRI-3_member-1 | |
| PRI-3_member-2 | 1 |
| PRI-4_member-1 | |
| PRI-4_member-2 | |

Port vector Egress-2
| | |
|---|---|
| PRI-1_member-1 | |
| PRI-1_member-2 | |
| PRI-2_member-1 | |
| PRI-2_member-2 | 1 |
| PRI-3_member-1 | |
| PRI-3_member-2 | |
| PRI-4_member-1 | |
| PRI-4_member-2 | |

Port vector Egress-3
| | |
|---|---|
| PRI-1_member-1 | |
| PRI-1_member-2 | 1 |
| PRI-2_member-1 | |
| PRI-2_member-2 | |
| PRI-3_member-1 | |
| PRI-3_member-2 | |
| PRI-4_member-1 | |
| PRI-4_member-2 | |

Port vector Egress-4
| | |
|---|---|
| PRI-1_member-1 | |
| PRI-1_member-2 | |
| PRI-2_member-1 | |
| PRI-2_member-2 | |
| PRI-3_member-1 | |
| PRI-3_member-2 | |
| PRI-4_member-1 | 1 |
| PRI-4_member-2 | |

Figure 9F

Ingress Vector Egress-1
| 1 | 2 | 3 | 4 |
|---|---|---|---|
| 1 | | | |
| | 1 | | |

Ingress Vector Egress-2
| 1 | 2 | 3 | 4 |
|---|---|---|---|
| | | | |
| | | 1 | |

Ingress Vector Egress-3
| 1 | 2 | 3 | 4 |
|---|---|---|---|
| 1 | | | |
| 1 | | | |

Ingress Vector Egress-4
| 1 | 2 | 3 | 4 |
|---|---|---|---|
| | | | |
| | | | 1 |

Figure 9G

| Grant handler 450-1 | |
|---|---|
| Requested Ingress | Port |
| 1 | 2 |

| Grant handler 450-2 | |
|---|---|
| Requested Ingress | Port |
| 3 | 4 |

| Grant handler 450-3 | |
|---|---|
| Requested Ingress | Port |
| 1 | 2 |

| Grant handler 450-4 | |
|---|---|
| Requested Ingress | Port |
| 4 | 7 |

SYSTEM AND METHOD FOR SCHEDULING A CROSS-BAR

FIELD OF THE INVENTION

The present invention relates generally to data communications systems. More particularly, the present invention relates to scheduling of crossbar data switches.

BACKGROUND OF THE INVENTION

Crossbars are well known in the art, dating back to the days of early telephony switches. Their aim was to connect between a caller and a receiver in electromechanical telephony exchanges. In the digital era, crossbar switches are high speed switching devices commonly used for transferring packet switched data in communications systems, allowing the matching of sources with desired destinations. Crossbars establish concurrent connections between a plurality of inputs and a plurality of outputs. A common problem with crossbars occurs when multiple packets arrive simultaneously at the same input, or if multiple packets are destined to the same output. In such cases the passage of cells or packets through the switches has to be efficiently scheduled. Therefore, packets waiting to be scheduled (i.e., to be sent to their intended destination) are kept in a queue or a buffer.

A key factor in the design of a crossbar scheduler is to achieve maximum throughput. Additionally, the scheduler has to ensure fairness, or in other words to provide for each input-output connection its fair share of bandwidth. An efficient scheduler should also avoid cases of starvation (i.e., each input-output connection should not wait longer than a predefined amount of time to be connected).

One type of scheduling techniques for crossbars is based upon matching. Schedulers which use the abovementioned matching technique, make matches between the input adapters of a switch, herein referred to as "ingress", and the output adapters of a switch, herein referred to as "egress". The scheduler matches ingresses that arbitrate for service with one or more egresses. One of the ways to match ingresses to egresses is the iterative serial-line Internet protocol hereinafter, referred to as the "ISLIP" algorithm. The ISLIP algorithm performs ingress to egress matching in three steps: (a) the request step; (b) the grant step; and (c) the accept step. In the request step, the ingresses post requests to all egresses to which they desire access. In the grant step, each egress selects one such request and asserts a response signal stating the selected request. In the accept step, if an ingress receives a grant from only one egress, the ingress simply accepts it. If, on the other hand, the ingress receives more than one grant, it selects only one of the grants and accepts it. The selections that are made in both the grant and accept steps are made by means of a selection algorithm such as random, round robin, weighted round robin, or any other priority based selection algorithm.

Reference is now made to FIG. 1, where an example for using the ISLIP algorithm is shown. FIG. 1A shows the request step, where ingress "1" requests for egresses "1" and "2", ingress "3" requests for egresses "2" and "4", and ingress "4" requests for egress "4". FIG. 1B shows a possible grant step where each egress selects an input among those that requested it. In the example egress "1" selects ingress "1", and both egresses "2" and "4" select ingress "3". FIG. 1C shows the accept step where each ingress selects one of the granted egresses. In the example, ingress "1" accepts egress "1", and ingress "2" accepts egress "3", ingress "4" did not receive a match in this round.

Typically in crossbar systems each egress is connected to a plurality of ports, each of which ports has the capability to provide egress services to the different ingresses (i.e., if there is one egress, and it is connected to 4 ports, a requesting ingress can post 4 different requests, one to each of said ports). In systems that have a large number of ports and/or egresses, the number of requests posted by the ingresses can be very large (even larger than 256 requests, which is the maximum number of requests a crossbar in accordance with the prior art can efficiently handle). The upper bound of the number of requests posted is equal to P*E where "E" is the number of egresses and "P" is the number of ports connected to each of the egresses. For example if "E" equals 16 and "P" equals 64 then the upper bound of the number of requests is 1024. One known technique to deal with a large number of requests is by using the time slot algorithm. The time slot algorithm assigns each port a predetermine time farm, in which the designated port is opened for packets transmitting. However, the time slot algorithm does not schedule connections according to different priorities of the ports, as performed in accordance with the present invention.

The prior art provides no crossbar switch capable of scheduling connections in accordance with prioritiesed connections (i.e., where each connection has a different priority grade), nor for that matter can it efficiently scheduling a number of requests higher than 256.

OBJECTS AND SUMMARY OF THE INVENTION

Thus, it is an object of the present invention to provide a method and system for scheduling connections between ingresses and egresses in cross bar systems that would efficiently support cross bars handling a large number of requests.

It is still another object of the present invention to provide a method and a system scheduling connections between ingresses and egresses in accordance with a priority based hierarchy selection of connections.

It is yet another object of the present invention to provide for scheduling connections between ingresses and egresses in cross bar systems that would find matches between requesting ingresses and available egresses quickly.

These objects, and others not specified hereinabove, are achieved by the present invention, an exemplary embodiment of which comprises a a crossbar switch having at least one ingress and at least one egress, each of the egresses is connected to at least one port, at least one scheduler for scheduling matches between the ingresses, and the egresses, in communication with the crossbar switch, and at least one memory for holding data which is useful in the process of scheduling the crossbar switch, which is in communication with the scheduler.

The scheduler schedules the matches between the ingresses and the egresses using data held in the memory regarding the ingresses, egresses, and the ports. The scheduler operates in accordance with a selection algorithm, which is based on prioritizing of the ports. Selections are performed hierarchically as will be detailed hereinbelow.

BRIEF DESCRIPTION OF THE DRAWINGS

The detailed description of the exemplary embodiment of the present invention which follows, may be more fully understood by reference to the accompanying drawings, in which:

FIG. 1—is an example of using the prior art ISLIP algorithm;

FIG. 7A—illustrates the process of computing the port vector;

FIG. 7B—illustrates the process of computing the ingress vector;

FIG. 9B—is a table showing which port is requested by which ingresses in accordance with an example scenario demonstrating the operation of the present invention;

FIG. 9C—presents 4 tables, each representing a queue report generated by the queue handler in accordance with an example scenario demonstrating the operation of the present invention;

FIG. 9D—presents 4 tables, each table holding the data kept in a port memory of an egress handler in accordance with an example scenario demonstrating the operation of the present invention;

FIG. 9E—presents 4 tables, each table holding the data kept in an ingress memory of an egress handler in accordance with an example scenario demonstrating the operation of the present invention;

FIG. 9F—presents 4 tables, each table holding the data kept in a port vector of an egress handler in accordance with an example scenario demonstrating the operation of the present invention;

FIG. 9G—presents 4 tables, each table holding the data kept in an ingress vector of an egress handler in accordance with an example scenario demonstrating the operation of the present invention;

FIG. 9H—presents 4 tables displaying the selected requests and their corresponding ports in the egresses in an example scenario demonstrating the operation of the present invention;

DETAILED DESCRIPTION OF THE INVENTION

The present invention provides a system and a method for scheduling connections between ingresses and egresses in crossbar switches systems. The system and method disclosed herein are of particular usefulness when the number of requests is relatively high (more than 256 requests). The exemplary embodiment of the present invention uses a scheduler 220 in order to match ingresses with egresses. Scheduler 220 matches the ingresses with the egresses by means of a three stage hierarchical selection algorithm ("HSA"), and unique memory structures, hereinafter referred to as memory bank 244, that handle the requests posted by the ingresses. In order to achieve optimal matching, the abovementioned scheduler requires at least one round of said HSA. Presently, scheduler will reach optimum results in two rounds. Although it is possible to have more than two rounds, the effect of such additional rounds on getting a better matching solution is negligible and will therefore be inefficient.

Figure 2:
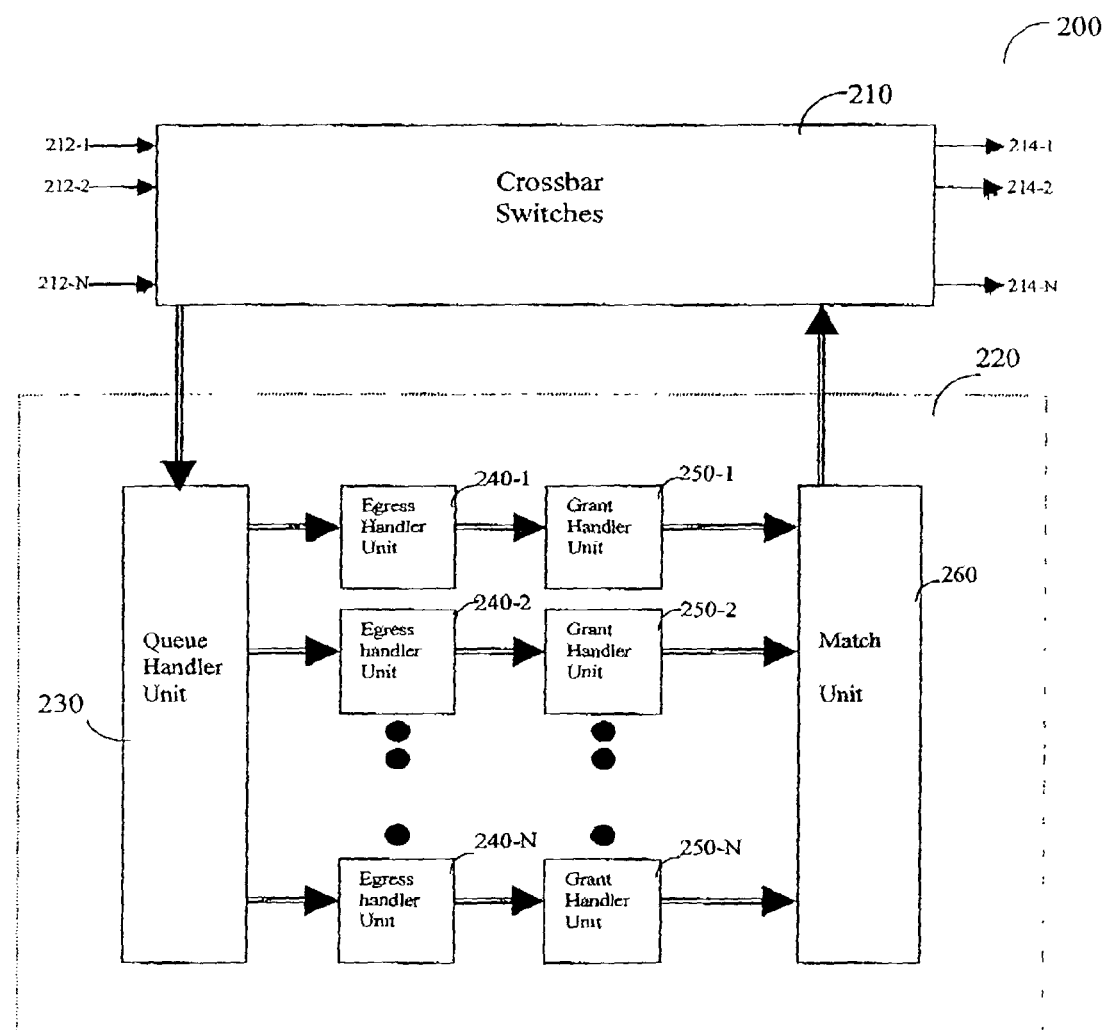
FIG. 2—is a schematic block diagram of a scheduler in accordance with the present invention.
Figure 3:
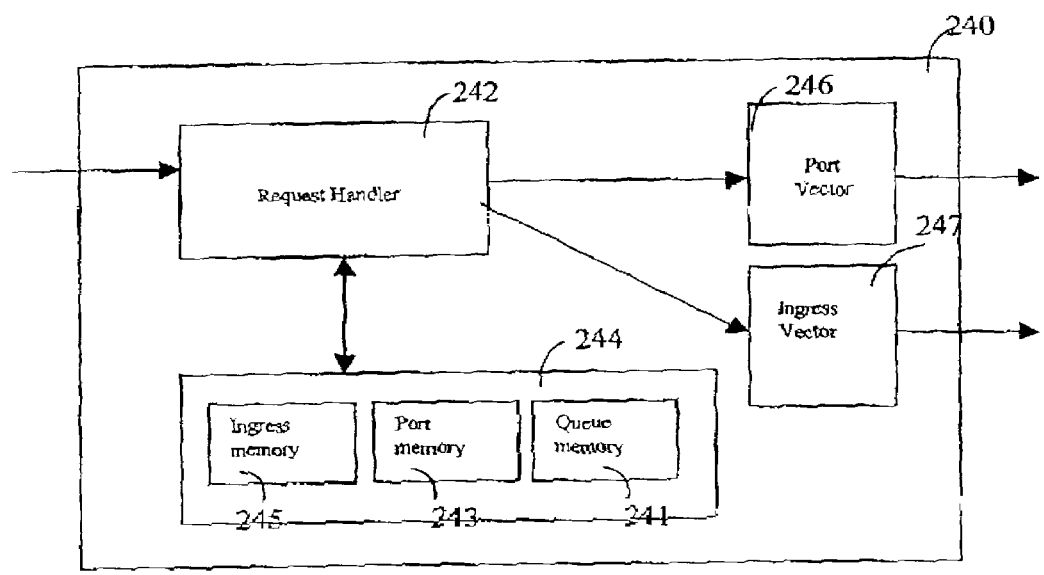
FIG. 3—is a schematic block diagram of an egress handler.

Reference is now made to FIG. 2 where an exemplary embodiment of a system 200 in accordance with the present invention, comprising a crossbar switch 210 and a scheduler 220 is shown. Crossbar switch 210 connects the N ingresses 212 1–N to any of the egresses 214 1–N by means of scheduler 220. Scheduler 220 matches the N ingresses 212 1–N to the N egresses 214 1–N by means of the HSA and the use of memory bank 244 which will be described in more details hereinbelow. Each of egresses 214 is connected to at least one port. Scheduler 220 comprises a queue handler 230, egress handlers 240 1–N, one per egress, N grant handlers 250 1–N, and a matcher 260. FIG. 3 further shows that each egress handler 240 is comprised of request handler 242, memory bank 244, port vector 246 and ingress vector 247.

Packets traveling through a network are divided into system blocks of data. Each system block has a fixed number of bytes of data. Each of ingresses 212 of crossbar switch 210 has at least one queue that holds system blocks that are to be scheduled for sending to a desired destination egress. The total number of queues in each ingress is equal to E*P where "E" is the number of egresses and "P" is the number of ports, each queue holds system blocks destined to be channeled to the corresponding port and egress. Ingress queue holds information about the requested egress, and the port through which the request is channeled to the egress. Similarly, each of egress 214 contains at least one queue that holds incoming system blocks to be further channeled through the communication system. The number of queues in each egress is equal to I*P where "I" is the number of ingresses and "P" is the number of ports. In an exemplary embodiment of the present invention, both "E" and "I" are equal to N. Egress queue includes information identifying the source ingress from which the system block came and the port through which it reached the egress.

At the beginning of a matching process, each of ingresses 212 and of egresses 214 generates a queue status report. In accordance with one exemplary embodiment of the present invention, the ingress' status reports include the following details: a unique ingress queue number, the amount of system blocks left after the removal of a served system block (hereinafter "INCNT") for each queue, a new request indication indicating that the ingress wishes to send more system blocks to the destination ports, and the number of system blocks removed from the queue since the beginning of the matching process. The egress status report comprises a unique egress queue number and backpressure (hereinafter "BP") indication. Backpressure is a logical indication, indicating when an egress queue is full, and therefore cannot accept new system blocks (i.e., BP=0 means that the egress can not accept more requests, BP=1 means that the egress can accept one more request etc.).

Queue handler 230, receives the queue status reports from ingresses 212 and from egresses 214, reads the data in the queue status reports, and rearranges the data into N separate and autonomous reports, one per egress, hereinafter referred to as egress reports. Each egress report contains information about the ingresses which posted requests and about the ports through which the posted requests reached the specific egress.

It should be noted that a person of ordinary skill in the art could easily implement crossbar 210 with different queue structures not limited to the above mentioned exemplary queue structure.

With reference to FIG. 3, request handler 242, is the component within egress handler 240 that receives and handles the egress reports provided by queue handler 230. Additionally, request handler 242 updates memory bank 244 according to the incoming egress reports, and computes the port vector 246 of the ports to which the requests are addressed. All of these actions will be described below in more detail.

Figure 4:
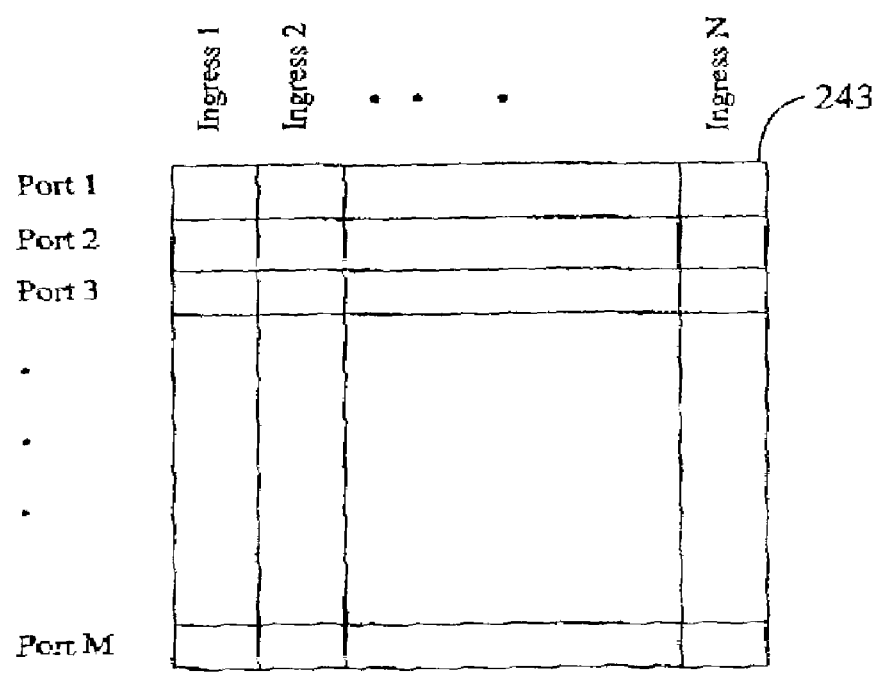
FIG. 4—is an illustration of the port memory.

Memory bank 244 comprises three memory structures, queue memory 241, port memory 243, and ingress memory 245. These memory structures are used for holding data to be used in the process of handling the requests that were made to the corresponding egress. Queue memory 241, contains the status of each queue within the egress. With reference to FIG. 4, port memory 243 stores the actual requests that were made to the egress. The requests are sorted according to the ports through which they came and the ingress from which the requests came. As shown in FIG. 4, port memory 243 is a table where each row represents a port and each column represents an ingress. As mentioned hereinabove, the requests are arranged in the table according to these parameters (ingress and port). Port memory 243 is used during the first round of the hierarchical scheduling algorithm, further described hereinbelow, for the purpose of selecting a requesting ingress and a corresponding port through which the request of the selected ingress came (an ingress can post several identical requests to the same egress by posting the same request towards more than one port, and therefore there is a need to select a single port).

Figure 5:
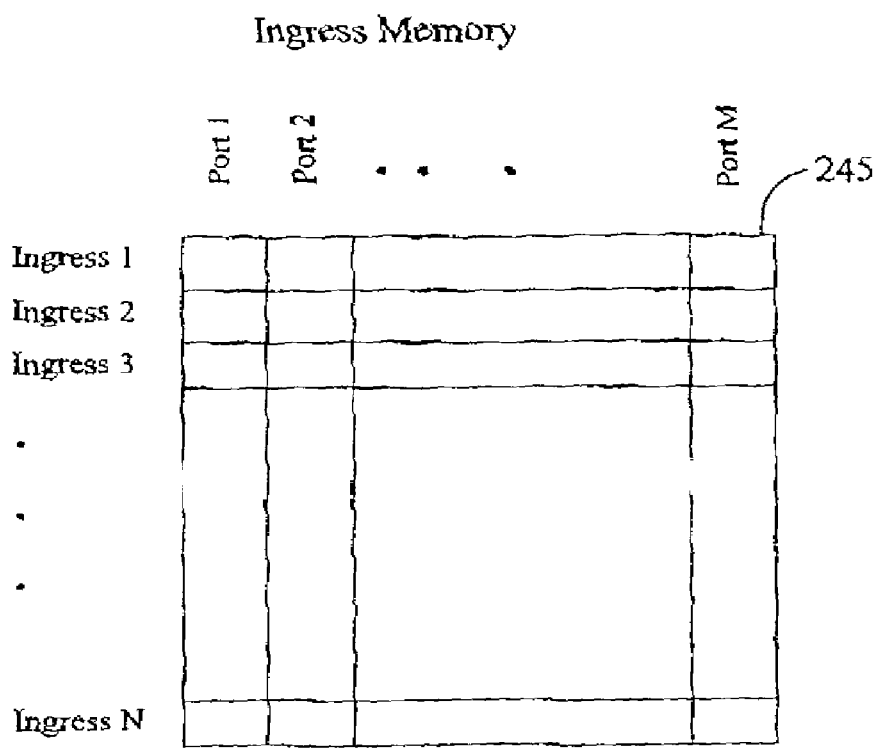
FIG. 5—is an illustration of the ingress memory.

With reference to FIG. 5, ingress memory 245 arranges the requests arriving from each ingress in a table where each row represents an ingress and each column represents a port. Ingress memory 245 is used to hold the ingresses that posted requests during the first and second round of the scheduling algorithm for selection of ingress.

Port vector 246 includes an indication for each port whether that port was requested by one or more of ingresses 212 1–N. Port vector 246 is comprised of a number of bits which equals the number of ports, each bit represents a single port. In order for the HSA to perform hierarchical selections, port vector 246 is divided into classes of priorities, each class including a constant number of members. For example, a port vector 246 having 64 destination ports can be divided to sixteen priorities, each priority class including four members. Each bit in port vector 246 represents a different destination port. If there was no request posted through a specific port, the bit representing the port equals 0. If, on the other hand, there was a request posted through said port, the bit representing the port equals 1. By hierarchical selection it is meant that first a priority is selected, and then one of the members of the selected priority is selected thereby designating a specific port, as will be explained in more detail hereinbelow.

Ingress vector 247 includes a per ingress indication whether such ingress posted at least one request. Ingress vector 247 is comprised of a number of bits which equals the number of ingresses, each bit represents a single ingress. Each bit in ingress vector 247 represents a different ingress. If there was no request posted by a specific ingress, the bit representing the ingress equals 0. If, on the other hand, there was a request posted by the ingress, the bit representing the ingress equals 1.

Scheduler 200 also comprises of N grant handlers 250 1–N and of matcher 260. Each of grant handlers 250 1–N selects a port through which requests came, and one of the specific ingress which posted a request through the selected port to receive a system block therefrom. The selection procedure comprises the following steps. Grant handler 250 implements grant step of a scheduling algorithm and transfers the result to matcher 260. In instances where more than one egress selects the same ingress and the same port to pick a system block from, matcher 260 selects one of the egresses to be the one that picks the system block from that queue.

Figure 6:
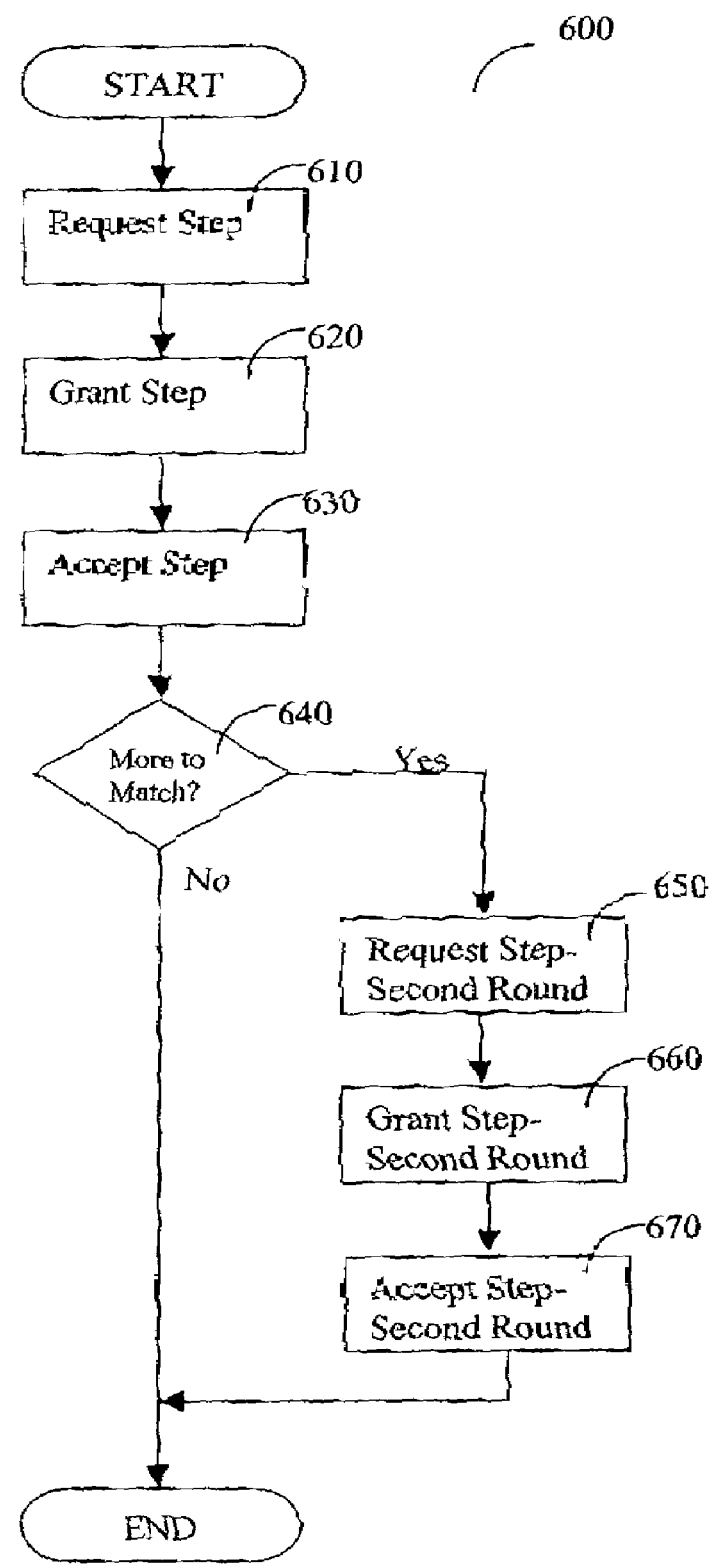
FIG. 6—is a flow chart of an exemplary embodiment of a scheduling algorithm in accordance with an exemplary embodiment of the present invention.

Reference is now made to FIG. 6 where a flow chart 600 of a scheduling algorithm in accordance with an exemplary embodiment of the present invention is shown. Algorithm 600 is an improved implementation of a traditional ISLIP algorithm. As abovementioned, the system of the present invention operates in accordance with algorithm 600 to the end of matching between ingresses 212 and egresses 214. The system of the present invention repeats algorithm 600 at least once.

In request step 610, each of egress handlers 240 loads its respective egress report from queue handler 230 by means of request handler 242. Request handler 242 updates queue memory 241, ingress memory 245, and port memory 243 of memory bank 244 in accordance with the egress reports. An ingress intending to post a request to a designated port and egress checks its INCNT and the BP of the designated egress. An ingress actually posts the request to the designated egress if the ingress' INCNT is greater than zero and the BP indication of the designated egress is not set to zero. In order to determine which are the requested ports, request handler 242 computes port vector 246. Each bit in port vector 246 indicates if a specific port was requested by ingress 212. A port can be requested by ingresses 212 1–N. Computing port vector 246 is done by means of performing a logical OR between the columns in each row of the port memory.

An illustration of computing port vector 246 can be seen in FIG. 7A. Request handler 242 also saves information on all the ingress that requested a port in ingress vector 247. Ingress vector 247 contains N bits, one bit per ingress. Computing ingress vector 247 is done by performing a logical OR between the columns in each row in the ingress memory 245. An illustration of computing ingress vector 247 can be seen in FIG. 7B.

Figure 8:
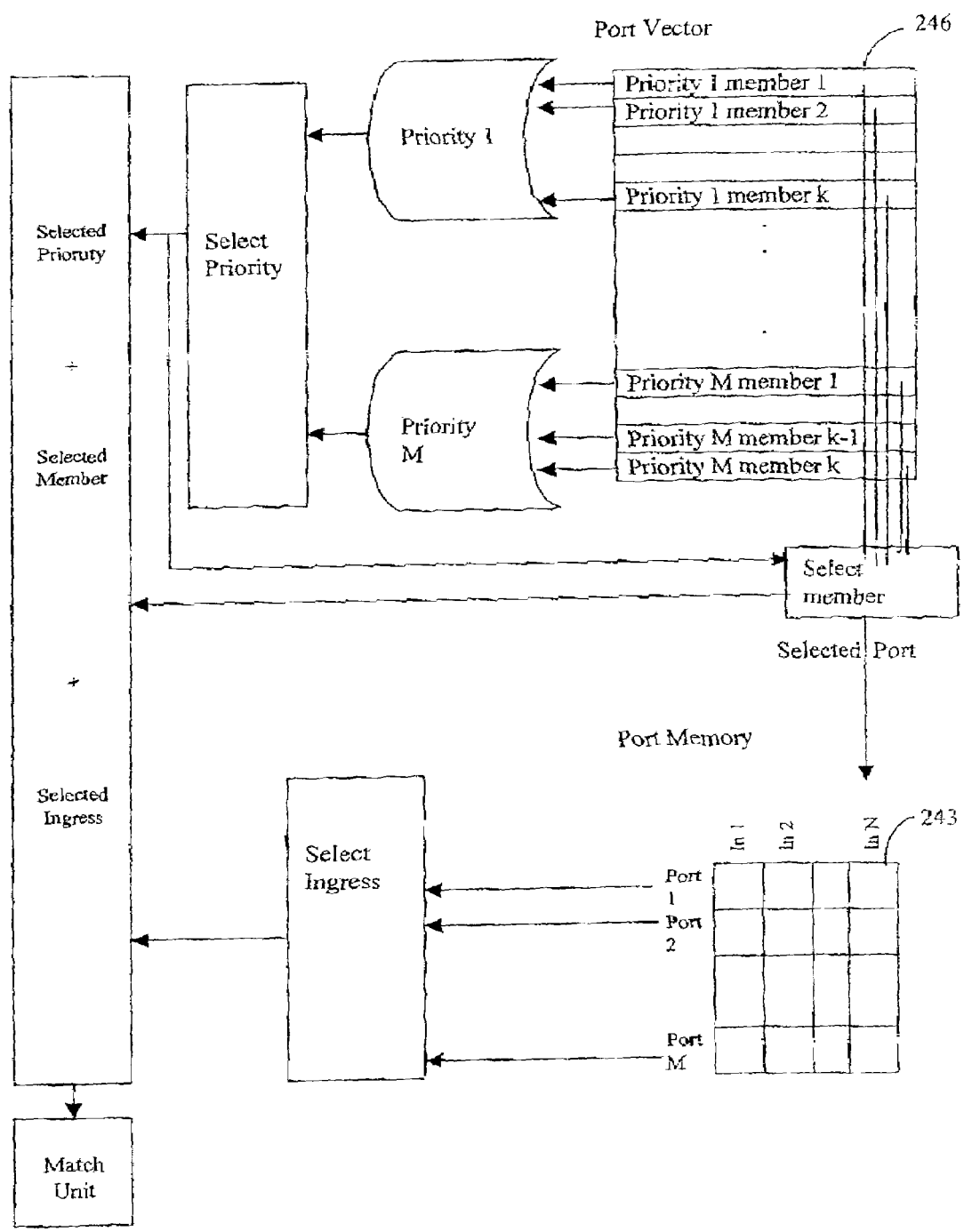
FIG. 8—illustrates the process of selecting a port.

With reference to FIG. 8, in grant step 620, each grant handler 250, selects one port from the ports which channeled requests, and a specific ingress from ingresses 212, which sent a request through said selected port, to be the match of the egress corresponding to the specific grant handler 250. Said selection is made by means of the following steps. First, grant handler 250 generates port vector 246 by performing a logical OR between the members in each priority class. Next, grant handler 250 selects a priority class according to a pre-determined policy. In accordance with an alternative embodiment of the present invention, said pre-determined policy is dynamic in nature in the sense that it adapts (either by itself or in accordance with the instructions of a system administrator) to cope with specific occurrences. Knowing the selected priority class, grant handler 250 selects a specific member from that class. After hierarchically selecting the priority class and a member from that class (i.e., after selecting a specific port), request handler 250 searches the port memory 243 of the ingresses that requested for the selected port represented by the selected priority class and member (i.e., if member 2 of priority 3 was chosen the request handler 250 searches for all the ingresses that requested the port which is the second member of the third priority class). If there is more than one ingress of ingresses 212 that requested the same port, the grant handler 250 chooses one of them. Selection is made by using a selection algorithm such as strict priority, round robin, weighted round robin, least recently used ("LRU"), random, and others. Finally, each of grant handlers 250 of each of egresses 214 reports the selected port and ingress 212 to matcher 260.

In accept step 630, if more than one egress of egresses 214 granted the same ingress of ingresses 212, matcher 260 selects a single ingress of ingresses 212 and a corresponding port through which the selected ingress channeled its request. Accept step comprises of the following stages—Firstly, matcher 260 captures all grants from grant handlers 250 1–N (i.e., which egress granted which ingress through which port), and reports the grants to matcher 260. Secondly, matcher 260 selects one to one egress—ingress connections by means of a selection algorithm such as round robin, weighted round robin, LRU, and others. After matching ingress-egress connections, matcher 260 reports the matching results to crossbar 210, and crossbar 210 updates memory bank 244. In step 640 matcher 260 checks if all the requests were matched. In a case where there are more requests to serve, a second round of the algorithm is applied. A person of ordinary skill in the art could easily add additional matching rounds if such rounds are necessary to improve or otherwise optimize the overall performance.

In step 650, egress handler 240 starts a second round of matching, by receiving information from matcher 260 about the remaining ingresses to be matched (i.e., matcher 260 updates ingress vector 247). Subsequently, egress handler 240 computes the ingress vector 247 of the ingresses that were not matched in the previous round. Calculation is made by performing a logical OR operation between all columns in each row in the ingress memory table. In step 660, each of grant handlers 250 1–N capture the ingress vector 247 of the unmatched ingresses, and select one of these requesting and unmatched ingresses. According to the selected ingress, grant handler 250 selects the port by selecting a priority class, and a member within the class. The selection of priority class and member is made using the same mechanism that was used in step 620. Grants are reported to matcher 260. In step 670, matcher 260 selects one to one ingress—egress connections per granted ingress and port using the same mechanism as described in step 670. Matcher 260 reports the matching results to crossbar switches, and updates the memories in memory bank 244.

Figure 9A:
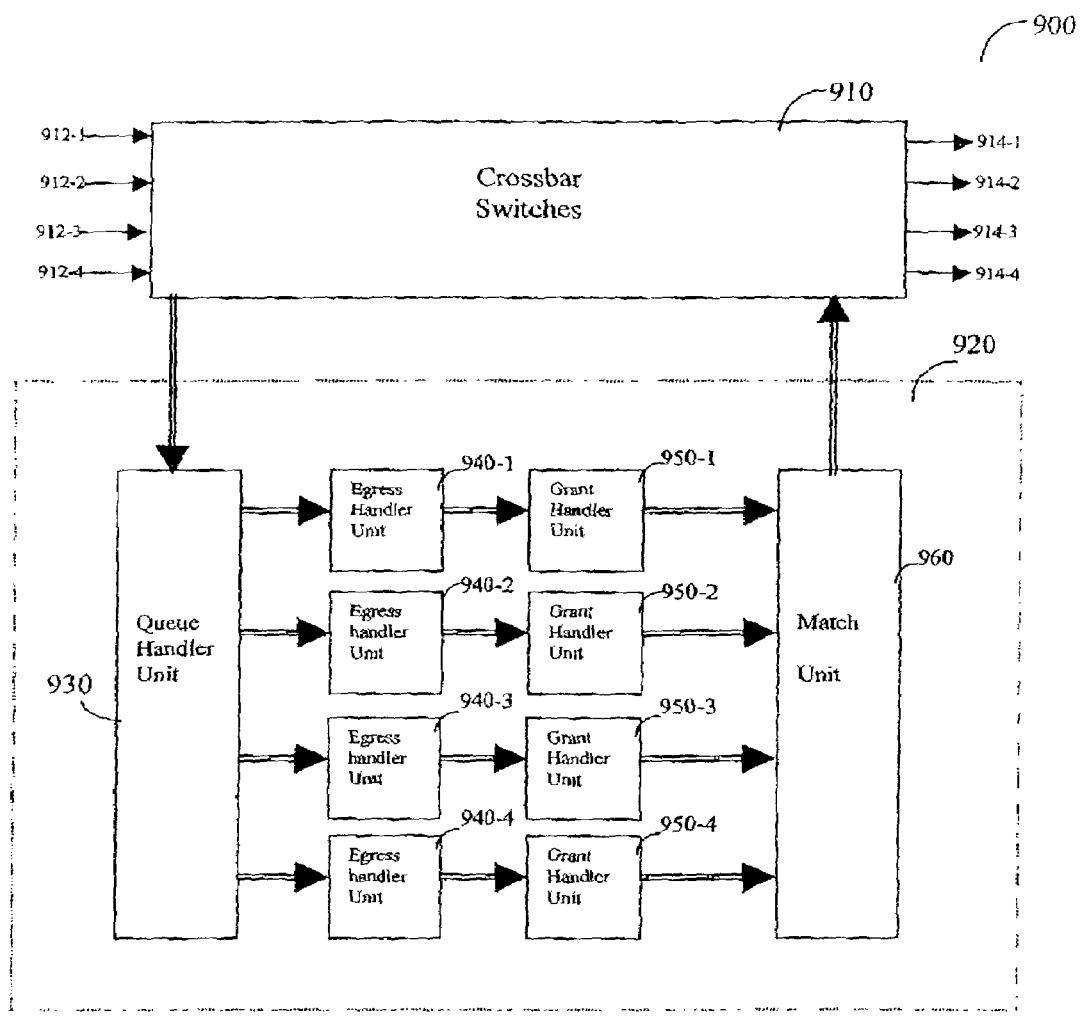
FIG. 9A—is a block diagram showing the use of an exemplary embodiment of a scheduling algorithm in accordance with the present invention.

Reference is now made to FIG. 9A where a non-limiting exemplary system 900 comprising of a scheduler 920 and a crossbar 910 further comprising four ingresses 912 1–4, and four egresses 914 1–4, is shown. Scheduler 920 comprises queue handler 930, egress handlers 940 1–4, grant handlers 950 1–4, and matcher 960. Egresses 914 are connected to eight common ports.

The operation of algorithm 600 is now illustrated through the following nonlimiting example and with reference to FIG. 9A. According to algorithm 600 in request step 610, ingress 912-1 makes requests to egress 914-1 ports "1" and "2", and to egress 914-3 port "2". Ingress 912-2 makes a requests to egress 914-1 port "2" and port "6". Ingress 912-3 make a request to egress 914-2 port "4". Ingress 912-4 makes a request to egress 914-4 port "7". The ingresses' requests are shown in FIG. 9B. With reference to FIG. 9C Queue handler 930 rearranges the incoming requests to four separate egress reports, one per egress. With reference to FIG. 9D and FIG. 9E, each egress handler 940 updates the port memory 243 and ingress memory 245 according to the egress reports. FIG. 9D and FIG. 9E show the port memory 243 and ingress memory 245 respectively located in each egress handler 940. The memory content correlates with the actual posted requests, where "1" represents a posted request. According to algorithm 600, in grant step 620 each of egress handlers 940 computes the port vector of the ports through which requests were posted. As mentioned hereinabove, port vector 246 is computed by applying a logical OR operation on the ports, to check through which of the ports at least one request was made by any of ingresses 212. In the present example the eight destination ports are divided into four priority classes "PRI-1" through "PRI-4" where each priority class includes two members. FIG. 9F shows the port vectors content in each egress handler 940, where "1" indicates that at least one request was posted through the port. Additionally, in grant step 620 each egress handler 940 computes the ingress vector 247 of the ingresses from which the requests came. Ingress vector 247 is generated by setting a bit in the vector of the ingress if the corresponding ingress made at least one request. FIG. 9G shows ingress vectors 247 content for each egress handler 940. According to algorithm 600, in accept step 630, each grant handler 950 chooses a priority class, a specific member within the priority class and an ingress. In the present example selections are made only to egress 914-1 since this is the only egress that received requests from more than one ingress. Therefore, according to grant step 620, grant handler 950-1 first selects priority class, where the selection is made between "PRI-1" and "PRI-3". Here, the selected class is "PRI-1", accordingly grant handler 950 selects a member between "PRI-1_member-1", and "PRI-1_member-2". In this example we assume that the selected member is "PRI-1_member-2", and therefore grant handler 950-1 further has to choose a single ingress from ingresses 912-1 and 912-2. The need to further choose between the ingresses arises from the fact that both ingress 912-1 and 912-2 asked for egress 914-1 port "2". If on the other hand the selected member was PRI-1_member-1, there is no need for a further stage of selection of an ingress. FIG. 9H shows the grant result of grant handler 950 1-4. As can be seen in FIG. 9H both egresses 914-1 and 914-3 granted ingress 912-1 port "2". Therefore, according to the following step of algorithm 600, matcher 960 selects a distinct egress to match to ingress 912-1 port "2". The unmatched ingress requests 912-1 port "1", ingress 912-2 port "2", and ingress 912-2 port "6" will be matched in the second round as follows.

In step 640 matcher 960 checks if all requests were matched. In this example matcher 960 identifies that ingresses 912-1, 912-2 were left unmatched, and therefore starts a second round of the algorithm.

In step 650, egress handler 940 receives information from matcher 960 regarding ingresses 912-1 and 912-2, thereby beginning the second round.

Subsequently, egress handler 940 computes the ingress vector 247 of the unmatched ingress. In step 660, each of grant handlers 950 capture the ingress vector 247 of the unmatched ingress. In this example, unmatched ingresses requested only egress 914-1, and grant handler 950-1 has to select between ingresses 912-1 and 912-2. Since both ingresses 912-1 and 912-2 requested for egress 914-1 only one of them is granted. In this example we assume that ingress 912-2 is granted. The grants are then reported to matcher 960, which matches between ingress 912-2 and egress 914-1. Matcher 260 then reports the matching results from the two matching rounds to the crossbar switches, and updates the memories in memory bank 244.

What is claimed is:

1. A crossbar system comprising:
   (a) a crossbar switch having a first plurality of ingresses and a second plurality of egress ports;
   (b) at least one scheduler for scheduling matches between ingresses and said egress ports, in communication with said crossbar switch; and
   (c) at least one memory in communication with said scheduler and configured to hold at least one data structure containing an indication of the egress ports to which each of said ingresses has posted requests to send data;
   wherein said scheduler is arranged to derive from said at least one data structure a port vector, indicating which of said egress ports have been requested by one or more of said ingresses, and an ingress vector, indicating the ingresses that have posted one or more of said requests, and to apply a selection algorithm using said port vector and said ingress vector to schedule the matches to be applied by said crossbar switch.

2. A crossbar system in accordance with claim 1, wherein each of said egress ports has an assigned priority.

3. A crossbar system in accordance with claim 1, wherein said selection algorithm is a hierarchical selection algorithm.

4. A crossbar system in accordance with claim 1, wherein said scheduler comprises:
   (a) at least one queue handler;
   (b) at least one egress handler;
   (c) at least one grant handler; and
   (d) at least one matcher.

5. A crossbar system in accordance with claim 1, wherein said memory comprises:
   (a) at least one ingress memory;
   (b) at least one port memory; and
   (c) at least one queue memory.

6. A crossbar system in accordance with claim 2, wherein said selection algorithm is a hierarchical selection algorithm.

7. A crossbar system in accordance with claim 2, wherein said scheduler comprises:
   (a) at least one queue handler;
   (b) at least one egress handler;
   (c) at least one grant handler; and
   (d) at least one matcher.

8. A crossbar system in accordance with claim 2, wherein said memory comprises:
   (a) at least one ingress memory;
   (b) at least one port memory; and
   (c) at least one queue memory.

9. A crossbar system in accordance with claim 3, wherein said scheduler comprises:
   (a) at least one queue handler;
   (b) at least one egress handler;
   (c) at least one grant handler; and
   (d) at least one matcher.

10. A crossbar system in accordance with claim 3, wherein said memory comprises:
    (a) at least one ingress memory;
    (b) at least one port memory; and
    (c) at least one queue memory.

11. A crossbar system in accordance with claim 4 wherein said at least one egress handler comprises:
    (a) at least one request handler;
    (b) at least one memory.

12. A crossbar system in accordance with claim 5, wherein said memory is located in at least one memory selected from the group consisting of:
    (a) RAM memory;
    (b) flash memory; and
    (c) EEPROM memory.

13. A crossbar system in accordance with claim 5 wherein said at least one data structure comprises a table in said port memory, in which table each row represents a port, and each column represents an ingress.

14. A crossbar system in accordance with claim 5 wherein said at least one data structure comprises a table in said ingress memory, in which table each row represents an ingress, and each column represents a port.

15. A crossbar system in accordance with claim 6, wherein said selection algorithm comprises the steps of:
    (a) posting said requests for access from said ingresses to said egress ports;
    (b) saving said posted requests for access in said memory;
    (c) each egress granting a selected request out of said posted requests by means of hierarchical selection;
    (d) each of said ingresses which were granted by at least one egress in step (c), selecting one egress port from said at least one egress which granted said request; and
    (e) checking if there are unmatched requests, and if so, beginning a second matching round.

16. A crossbar system in accordance with claim 6, wherein said scheduler comprises:
    (a) at least one queue handler;
    (b) at least one egress handler;
    (c) at least one grant handler; and
    (d) at least one matcher.

17. A crossbar system in accordance with claim 6, wherein said memory comprises:
    (a) at least one ingress memory;
    (b) at least one port memory; and
    (c) at least one queue memory.

18. A crossbar system in accordance with claim 7 wherein said at least one egress handler comprises:
    (a) at least one request handler;
    (b) at least one memory.

19. A crossbar system in accordance with claim 8, wherein said memory is located in at least one memory selected from the group consisting of:
    (a) RAM memory;
    (b) flash memory; and
    (c) EEPROM memory.

20. A crossbar system in accordance with claim 8 wherein said at least one data structure comprises a table in said port memory, in which table each row represents a port, and each column represents an ingress.

21. A crossbar system in accordance with claim 8 wherein said at least one data structure comprises a table in said ingress memory, in which table each row represents an ingress, and each column represents a port.

22. A crossbar system in accordance with claim 9 wherein said at least one egress handler comprises:
    (a) at least one request handler;
    (b) at least one memory.

23. A crossbar system in accordance with claim 10, wherein said memory is located in at least one memory selected from the group consisting of:
    (a) RAM memory;
    (b) flash memory; and
    (c) EEPROM memory.

24. A crossbar system in accordance with claim 10 wherein said at least one data structure comprises a table in said port memory, in which table each row represents a port, and each column represents an ingress.

25. A crossbar system in accordance with claim 10 wherein said at least one data structure comprises a table in said ingress memory, in which table each row represents an ingress, and each column represents a port.

26. A crossbar system in accordance with claim 15, wherein step (a) of said selection algorithm further comprises the steps of:
    (a) receiving information regarding status of said ingresses and said egress ports;
    (b) updating said port memory, said ingress memory, and said queue memory;
    (c) determining which of said ingresses requested a connection; and
    (d) computing said port vector.

27. A crossbar system in accordance with claim 15, wherein step (c) further comprises the steps of:
    (a) capturing said port vector;
    (b) selecting a priority class;
    (c) selecting a member from the selected priority class; and
    (d) selecting an ingress that asked for said selected priority class and said selected member.

28. A crossbar system in accordance with claim 15, wherein step (d) of said selection algorithm further comprises the step of reporting an ingress-egress match to said crossbar switch.

29. A crossbar system in accordance with claim 15, wherein said scheduler comprises of:
    (a) at least one queue handler;
    (b) at least one egress handler;
    (c) at least one grant handler; and
    (d) at least one matcher.

30. A crossbar system in accordance with claim 15, wherein said memory comprises:
    (a) at least one ingress memory;
    (b) at least one port memory; and
    (c) at least one queue memory.

31. A crossbar system in accordance with claim 16 wherein said at least one egress handler comprises:
    (a) at least one request handler;
    (b) at least one memory.

32. A crossbar system in accordance with claim 17, wherein said memory is located in at least one memory selected from the group consisting of:
    (a) RAM memory;
    (b) flash memory; and
    (c) EEPROM memory.

33. A crossbar system in accordance with claim 26, wherein step (c) further comprises checking for each of said plurality of ingresses if said ingress has at least one system block to deliver, and checking if an egress requested by said ingress is not full.

34. A crossbar system in accordance with claim 26, wherein step (d) further comprises performing a logical OR operation between the columns in each row of said port memory.

35. A crossbar system in accordance with claim 27, wherein step (a) further comprises performing a logical OR operation between the columns in each row of said port memory.

36. A crossbar system in accordance with claim 27, wherein steps (b), (c) and (d) are each performed by means of at least one selection method selected from the group consisting of:
    (a) strict priority;
    (b) round robin;
    (c) weighted round robin;
    (d) least recently used; and
    (e) a random algorithm.

37. A crossbar system in accordance with claim 29 wherein said at least one egress handler comprises:
    (a) at least one request handler;
    (b) at least one memory.

38. A crossbar system in accordance with claim 30, wherein said memory is located in at least one memory selected from the group consisting of:
    (a) RAM memory;
    (b) flash memory; and
    (c) EEPROM memory.

39. A crossbar system in accordance with claim 30 wherein said at least one data structure comprises a table in said port memory, in which table each row represents a port, and each column represents an ingress.

40. A crossbar system in accordance with claim 30 wherein said at least one data structure comprises a table in said ingress memory, in which table each row represents an ingress, and each column represents a port.

41. A scheduler for controlling connections between a first plurality of ingresses and a second plurality of egress ports in a crossbar switch, comprising:
    (a) at least one queue handler;
    (b) at least one egress handler;
    (c) at least one grant handler;
    (d) at least one matcher; and
    (e) a selection algorithm,
    wherein said scheduler schedules matches between said first plurality of ingresses and second plurality of egress ports using at least one data structure held in a memory, said data structure containing an indication of the egress ports to which each of said ingresses has posted requests to send data,
    wherein said schedule derives from said at least one data structure a port vector, indicating which of said egress ports have been requested by one or more of said ingresses, and an ingress vector, indicating the ingresses that have posted one or more of said requests, and applies said selection algorithm using said port vector and said ingress vector to schedule the matches to be applied by said crossbar switch.

42. A scheduler in accordance with claim 41, wherein each of said egress ports is assigned a priority.

43. A scheduler in accordance with claim 42, wherein said selection algorithm is a hierarchical selection algorithm.

44. A scheduler in accordance with claim 43, wherein said selection algorithm comprises the following steps:
    (a) posting requests for access from said ingresses to said egress ports;
    (b) saving said posted requests for access in said memory;
    (c) each egress granting a selected request out of said posted requests by means of hierarchical selection;
    (d) each of said ingresses which were granted by at least one egress in step (c), selecting one egress port from said at least one egress which granted said request; and
    (e) checking if there are unmatched requests, and if so, beginning a second matching round.

45. A scheduler in accordance with claim 43, wherein each of said at least one egress handler comprises:
    (a) at least one request handler; and
    (b) at least one memory.

46. A scheduler in accordance with claim 43, wherein said at least one memory comprises:
    (a) port memory;
    (b) ingress memory; and
    (c) queue memory.

47. A scheduler in accordance with claim 44, wherein step (a) of said selection algorithm further comprises the steps of:
- (a) receiving information regarding status of said ingresses and said egress ports;
- (b) updating said at least one data structure in said memory;
- (c) determining which of said ingresses requested a connection; and
- (d) computing said port vector.

48. A scheduler in accordance with claim 44, wherein step (c) further comprises the steps of:
- (a) selecting a priority class;
- (b) selecting a member from the selected priority class; and
- (c) selecting an ingress that asked for said selected priority class and said selected member.

49. A scheduler in accordance with claim 44, wherein step (d) of said selection algorithm further comprises the step of reporting an ingress-egress match to said crossbar switch.

50. A scheduler in accordance with claim 46, wherein said memory is located in a memory selected from the group consisting of:
- (a) RAM memory;
- (b) flash memory; and
- (c) EEPROM memory.

51. A scheduler in accordance with claim 46 wherein said at least one data structure comprises a table in said port memory, in which table each row represents a port, and each column represents an ingress.

52. A scheduler in accordance with claim 46 wherein said at least one data structure comprises a table in said ingress memory, in which table each row represents an ingress, and each column represents a port.

53. A scheduler in accordance with claim 47, wherein step (c) further comprises checking for each of said plurality of ingresses if said ingress has at least one system block to deliver, and checking if the egress requested by said ingress is not full.

54. A scheduler in accordance with claim 47, wherein step (d) further comprises performing a logical OR operation between the columns in each row of said port memory.

55. A scheduler in accordance with claim 48, wherein step (a) further comprises performing a logical OR operation between the columns in each row of said port memory.

56. A scheduler in accordance with claim 48, wherein steps (b), (c) and (d) are each performed by means of at least one selection method selected from the group consisting of:
- (a) strict priority;
- (b) round robin;
- (c) weighted round robin;
- (d) least recently used; and
- (e) a random algorithm.

57. A method for scheduling connections between a first plurality of ingresses and a second plurality of egress ports in a crossbar switch, comprising the steps of:
- (a) posting requests for access from said ingresses to said egress ports;
- (b) saving an indication of the egress ports to which each of said ingresses has posted requests to send data in at least one data structure for access in a memory; and
- (c) granting a selected request out of said posted requests by deriving from said at least one data structure a port vector, indicating which of said egress ports have been requested by one or more of said ingresses, and an ingress vector, indicating the ingresses that have posted one or more of said requests, and applying a selection algorithm using said port vector and said ingress vector.

58. A method in accordance with claim 57, wherein step (a) further comprises the steps of:
- (a) receiving information regarding status of said ingresses and said egress ports;
- (b) updating said memory;
- (c) determining which of said ingresses requested a connection; and
- (d) computing said port vector.

59. A method in accordance with claim 57, wherein step (c) further comprises the steps of:
- (a) selecting a priority class;
- (b) selecting a member from the priority class selected in step (a); and
- (c) selecting an ingress that asked for said selected priority class and said selected member.

60. A method in accordance with claim 57 wherein said memory further comprises:
- (a) at least one ingress memory;
- (b) at least one port memory; and
- (c) at least one queue memory.

61. A method in accordance with claim 57, and comprising the step of reporting ingress-egress matches to said crossbar switch.

62. A method in accordance with claim 58, wherein step (c) further comprises checking for each of said plurality of ingresses if said ingress has at least one system block to deliver, and checking if an egress requested by said ingress is not full.

63. A method in accordance with claim 58, wherein step (d) further comprises performing a logical OR operation between the columns in each row of said port memory.

64. A method in accordance with claim 59, wherein deriving said port vector comprises performing a logical OR operation between the columns in each row of said port memory.

65. A method in accordance with claim 59, wherein steps (a), (b), and (c) are each performed by means of at least one selection method selected from the group consisting of:
- (a) strict priority;
- (b) round robin;
- (c) weighted round robin;
- (d) least recently used; and
- (e) a random algorithm.

66. A crossbar system comprising:
- (a) a crossbar switch having a first plurality of ingresses and a second plurality of egress ports;
- (b) scheduling means for scheduling matches between said ingresses and said egress ports, said means for scheduling being in communication with said crossbar switch; and
- (c) data storing means for storing data to be used by said means for scheduling matches, said data storing means being in communication with said means for scheduling matches and configured to hold at least one data structure containing an indication of the egress ports to which each of said ingresses has posted requests to send data;

wherein said scheduling means is arranged to derive from said at least one data structure a port vector, indicating which of said egress ports have been requested by one or more of said ingresses, and an ingress vector, indicating the ingresses that have posted one or more of said requests, and to apply a selection algorithm using said port vector and said ingress vector to schedule the matches to be applied by said crossbar switch.

67. A crossbar system in accordance with claim 66, wherein each of said egress ports has an assigned priority.

* * * * *